(12) United States Patent
Banaei et al.

(10) Patent No.: US 12,523,804 B2
(45) Date of Patent: Jan. 13, 2026

(54) ULTRA-THIN, FLEXIBLE THIN-FILM FILTERS WITH SPATIALLY OR TEMPORALLY VARYING OPTICAL PROPERTIES AND METHODS OF MAKING THE SAME

(71) Applicant: Everix, Inc., Orlando, FL (US)

(72) Inventors: Esmaeil Banaei, Orlando, FL (US); Justin Boga, Orlando, FL (US); Patricia Ximena Coronado Domenge, Orlando, FL (US)

(73) Assignee: Everix, Inc., Orlando, FL (US)

( * ) Notice: Subject to any disclaimer, the term of this patent is extended or adjusted under 35 U.S.C. 154(b) by 496 days.

(21) Appl. No.: 17/943,170

(22) Filed: Sep. 12, 2022

(65) Prior Publication Data

US 2023/0074071 A1 Mar. 9, 2023

Related U.S. Application Data

(63) Continuation of application No. 16/613,225, filed as application No. PCT/US2018/032871 on May 16, 2018, now Pat. No. 11,442,208.

(60) Provisional application No. 62/507,432, filed on May 17, 2017.

(51) Int. Cl.
*G02B 1/115* (2015.01)
*G02B 5/20* (2006.01)
*B29C 48/08* (2019.01)

(52) U.S. Cl.
CPC ............... *G02B 5/20* (2013.01); *G02B 1/115* (2013.01); *B29C 48/08* (2019.02)

(58) Field of Classification Search
CPC .......... G02B 5/20; G02B 1/115; G02B 1/111; G02B 5/22; B29C 48/08; B29C 55/023; B29C 55/18; B29L 2011/0066; B29D 11/00634; B29D 11/00788
See application file for complete search history.

(56) References Cited

U.S. PATENT DOCUMENTS

| 6,783,349 B2 * | 8/2004 | Neavin | B29C 48/21 425/133.5 |
| 2011/0240552 A1 * | 10/2011 | Ishizuka | B01D 69/02 210/490 |
| 2014/0308477 A1 * | 10/2014 | Derks | G02B 5/3083 428/141 |
| 2017/0066684 A1 * | 3/2017 | Oudard | G02B 1/18 |

* cited by examiner

*Primary Examiner* — Balram T Parbadia
(74) *Attorney, Agent, or Firm* — A. Robert Weaver; The Brickell IP Group, PLLC

(57) ABSTRACT

A method of making an optical filter film with varying optical properties includes the step of drawing a multilayer polymeric preform into an optical filter and varying at least one environmental condition being a member of the group including of heat, pressure, tension, and a drawing speed, the at least one environmental condition being varied over time or over a distance, or both, and causing a variation in layer thickness within the optical filter. The preform may be drawn through a furnace subjecting the preform to a heating power that varies across a width of the furnace or over time or both across the width and over time. The preform may also be drawn through the furnace while the drawing speed varies across a width of the furnace or over time or both across the width and over time.

6 Claims, 4 Drawing Sheets

ULTRA-THIN, FLEXIBLE THIN-FILM FILTERS WITH SPATIALLY OR TEMPORALLY VARYING OPTICAL PROPERTIES AND METHODS OF MAKING THE SAME

TECHNICAL FIELD

The present application relates to methods of making thin-film filters with optical properties varying over at least a length or a width or over time and to a method of manufacturing such flexible thin-film filters.

BACKGROUND

Multi-spectral imaging and hyper-spectral imaging are relatively new imaging methods that are growing with applications in several areas such as drug discovery and safety testing, biological microscopy, forensic analyses, security, environmental monitoring, textile production, food safety and quality control, and waste recycling and sorting.

Hyperspectral imaging (HSI) is a technique combining imaging and spectroscopy to survey a scene and extract detailed information. Also called imaging spectroscopy, HSI is a powerful, data-processing-intensive method that creates a "data cube" containing information about the properties of a target at hundreds to thousands of narrow wavelength bands within the system's field of view.

Hyperspectral imaging differs from a related technique, multispectral imaging, primarily in the number of wavelength bands and how narrow they are. The multispectral technique typically produces 2-D images of a few to a hundred wavelength bands, each covering tens of nanometers. Multispectral imaging combines two to five spectral imaging bands of relatively large bandwidth into a single optical system.

In contrast, hyperspectral imaging obtains a large 3-D cube of a hundred or even thousands of images, with dimensions (x, y, λ), each representing only a few nanometers in range. Multispectral imaging is faster and easier to process with its smaller data set, while hyperspectral imaging provides much greater complexity of data, higher resolution spectra, and is more versatile, with numerous emerging applications beyond satellite-based imaging.

Most techniques for both hyperspectral and multi-spectral imaging involve either spatially or temporally variable filters.

Some configurations use fixed filters on multiple detector arrays to simultaneously capture multiple image frames within various spectral bands. Some others use filter wheels or linear stages in front of a single detector array to sequentially capture image frames with various filters covering the detector array sequentially. Some use liquid crystal based filters that are tuned using electric stimulus of a liquid crystal cavity refractive index to shift its pass band wavelength.

A trending method involves discretely or continuously varying linear filters with the spectrum gradually shifting from one end of the filter to another end. These filters are usually edge filters (short pass or long pass) or band pass filters with the edge or center wavelength sweeping across a wide spectrum range on a single filter.

PRIOR ART

Variable filters are made through sophisticated variations of the readily expensive vacuum deposition process, making these filters significantly more expensive than comparable uniform filters. While production of high-performance uniform filters is highly expensive with limited scalability, variable filter production is even more expensive due to the sophisticated motion or lithographical steps added to the deposition process. In addition, traditional variable filters are manufactured on thick glass substrates making them suboptimal for optical systems that require light weight or compactness.

U.S. Pat. No. 9,597,829 and U.S. Publication 2017/0144915 describe methods of producing thin-film optical filters using thermal drawing of structured preforms. This method allows for production of thin film interference optical filters in the form of all-plastic flexible ultra-thin films and sheets. This method addresses two major drawbacks of the traditional vacuum coated thin film filters by providing significantly higher scalability and also providing ultra-thin filters that can bend and conform to curved surfaces in addition to being considerably more compact.

SUMMARY

According to a first aspect of the present invention, a method of making an optical filter film with varying optical properties includes the step of drawing a multilayer polymeric preform into an optical filter and varying at least one environmental condition being a member of the group including of heat, pressure, tension, and a drawing speed, the at least one environmental condition being varied over time or over a distance, or both, and causing a variation in layer thickness within the optical filter. Implementations may include one or more of the following features.

The at least one environmental condition may be heat, where the preform is drawn through a furnace subjecting the preform to a heating power that varies across a width of the furnace or over time or both across the width and over time. To this end, the method may include the step of: positioning heaters on opposite sides of the preform, where the opposite sides of the preform extend along a drawing direction of the preform, the width of the furnace extending across the drawing direction; and drawing the preform through the furnace in the drawing direction.

At least one of the heaters may subject the preform to a heating power varying along the width of the furnace. For example, the heating power may be varied by positioning the at least one heater to enclose an acute angle with the preform.

Additionally or alternatively, the heating power may be varied by heating the at least one heater to different temperatures along the width of the furnace. Additionally or alternatively, the heating power of the furnace may also be varied at least locally over time while the preform is being drawn through the furnace.

Additionally or alternatively, the at least one environmental condition may be a drawing speed, where the preform is drawn through a furnace while the drawing speed of drawing the preform through the furnace varies across a width of the furnace or over time or both across the width and over time, thereby producing a multilayer film with thinner film layers in zones exposed to the higher drawing speed than in zones exposed to the lower drawing speed that have thicker film layers.

For example, the drawing speed may be greater on one side of the width of the furnace than on an opposite side, or the drawing speed may be greater in a central portion of the width of the furnace than on lateral sides.

Additionally or alternatively, the drawing speed may alternate over time between a lower drawing speed and a higher drawing speed.

The method may further include the step of cutting out at least one piece from the multilayer film in a border region forming a transitional area from one of the zones with the thinner film layers to one of the zones with the thicker film layers.

A varying layer thickness may also be achieved by heat and tension, where the preform is drawn through a furnace subjecting the preform to a heating power to form an intermediate filter film, and the intermediate filter film is subsequently exposed to heat in a specified location and to a tension force in at least a longitudinal or lateral direction of the intermediate filter film, so that stretching the intermediate filter film until the layer thickness is permanently reduced in the specified location forms the optical filter having a locally reduced layer thickness.

Further details and benefits will become apparent from the following description of various examples by way of the accompanying drawings. The drawings are provided herewith for purely illustrative purposes and are not intended to limit the scope of the present invention.

DETAILED DESCRIPTION OF THE DRAWINGS

This application describes various variations of thermally drawing thin film optical filters to produce variable filters. The present application also discloses various post-processing methods of modifying a uniform filter made through the thermal drawing process to produce varying filters.

Methods of Producing Variable Filters During a Thermal Draw Process

Figure 1:
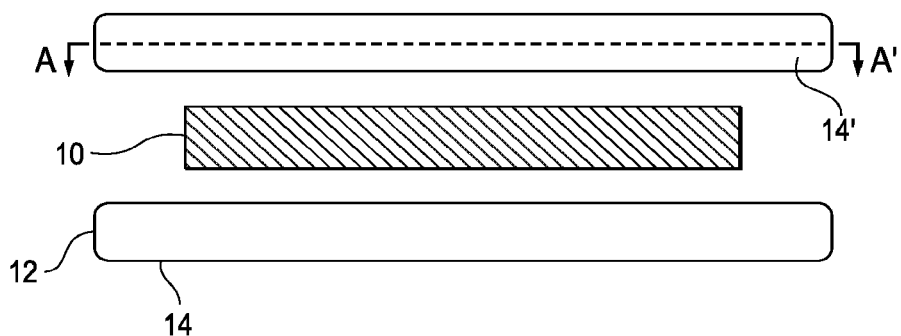
FIG. 1 shows a first schematic view of an arrangement for thermally drawing a multilayer thin-film filter.

Now referring to FIG. 1, for thermally drawing a thin-film multilayer filter film, a preform 10 is moved longitudinally through a furnace 12, which in FIG. 1 corresponds to a direction perpendicular to the image plane. The term "preform" is used to describe a polymer block that includes optical layers of a final filter film, but at layer thicknesses many times greater than the final thicknesses of the resulting layers of the filter film.

The furnace 12 has heaters 14 placed across the width of the furnace 12 on opposite sides of the preform 10 to heat the preform 10 as it moves through the furnace 12, into or out of the image plane of FIG. 1. To manufacture a film or sheet with a uniform spectral shape, the furnace 12 provides a correspondingly uniform heating density across the furnace 12. However, modifying the heat density along the heaters 14 that extend across the width of the furnace 12 can help create variable filters. Higher temperatures increase the flow of the polymer material and in return increase the thickness of the drawn film compared to lower temperatures when drawn at the same speed. This variation of thickness then generates a variation in the spectral properties within the filter, mainly in the form of a shifted spectrum with the same spectral shape.

Figure 2A:
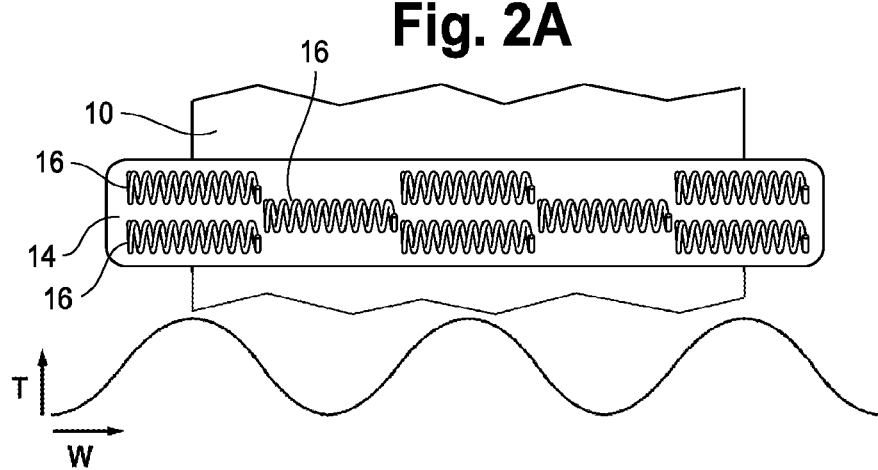
FIG. 2A shows a first example of distributing heating elements over the width of the furnace.
Figure 2B:
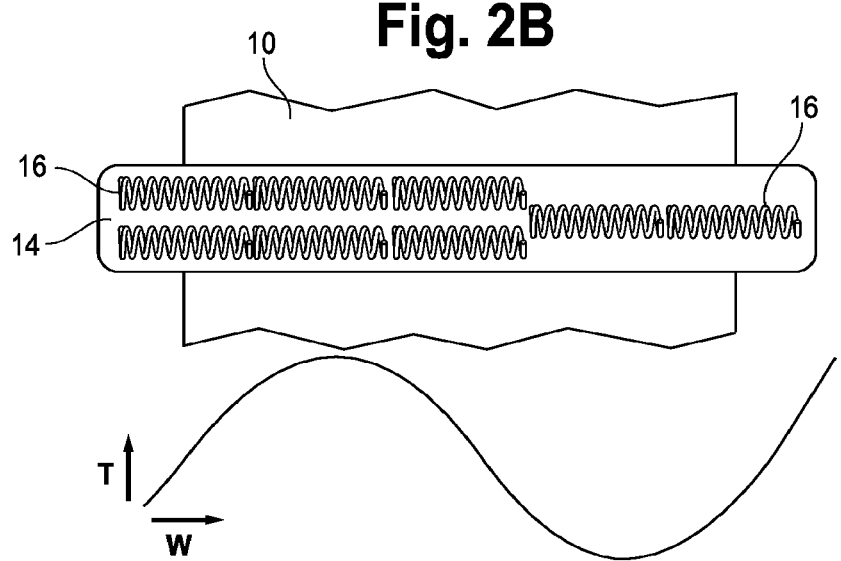
FIG. 2B shows a second example of distributing heating elements over the width of the furnace.

In two examples shown in FIGS. 2A and 2B, which are shown in a view along the line A-A' indicated in FIG. 1, the heaters 14 include heating elements 16 that are shown as coils. Notably, the illustration of the heating elements 16 as coils is not intended to exclude other types of heating elements 16, for example resistive heating elements of different shapes. In the shown example, the heaters 14 have varying heating density across the width of the furnace 12, which will be referred to as the horizontal direction. In this context, it is beneficial to place the width of the furnace 12 horizontally so that gravity affects the preform 10 and the resulting film uniformly across the width of the furnace 12 and the softened polymer material does not run off to one side.

In FIGS. 2A and 2B, a greater heat applied by the respective heater 14 is represented by two heating elements 16 shown at a common location across the width, and a lower heat is represented by only one heating element 16 in a given location. The representation is purely symbolic, and the greater heat generation and smaller heat generation may each be accomplished by a single heating element 16 or by a different number of heating elements 16. The arrangement merely indicates a higher heat output where a higher temperature is desired than in the locations, where a lower heating temperature is desired.

FIG. 2A illustrates an alternating heat density, represented by a sinusoidal temperature curve with alternating peaks and troughs of the temperature T across the width W of the furnace, reproduced underneath the schematics of the arrangement, while FIG. 2B shows a configuration, where one side of the heater 14 is at a higher temperature than the other side of the heater 14, indicated by a temperature curve that has a peak on the left side of the heater 14 and a trough on the right side. Notably, even the troughs of the temperature curves represent a temperature above the surrounding room temperature because these low-power heating zones still include heating elements 16 raising the temperature T above the surrounding temperature. The amplitude of the heating density in the various locations of the preform 10 (heating power reaching the preform at specific locations) and the rate of density change per length unit of the heater 14 across the width of the furnace 12 determine the spectral profile and dimensions of the resulting filter film or sheet by determining the layer thickness and the variation in layer thicknesses of the resulting filter film. Segments of the filter film or sheet in transition areas between zones of different heating power can be cut out of the resulting film into smaller shapes to be used as variable filters. The spatial profile of the filter variation follows the temperature curve of the heating zones, where the high-temperature heating zone provides a greater filter film thickness than the lower-temperature heating zones.

In an alternative example, the heating zones can be realized by individually controllable heating elements 16 to set predetermined local heating power densities, which can create various heating profiles across the furnace 12. If all heating zones are set to the same temperature (heating power density) reaching the preform, a uniform filter film or sheet will result.

Figure 3A:
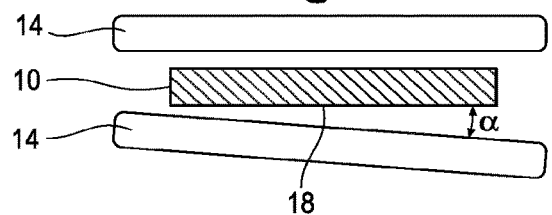
FIGS. 3A, 3B, and 3C show alternative arrangements for providing varying heat over the width of the furnace.
Figure 3B:
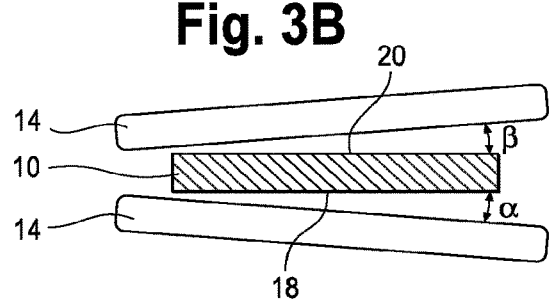
Figure 3C:
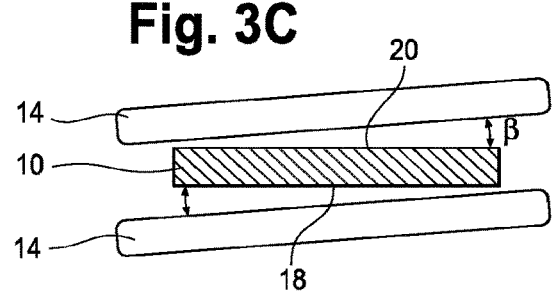

In another example illustrated in FIGS. 3A, 3B, and 3C, the thermal drawing furnace 12 has the option of changing the angle between at least one of the heaters 14 and the preform 10. FIGS. 3A, 3B, and 3C illustrate different configurations of the angled heaters 14 inside the furnace 12. Varying the distance of the preform 10 from one of the heaters 14 that provide a uniform heater temperature across their respective widths causes a variation of the heating power density in the location of the preform and thus a changing effective temperature applied to the preform 10. Thus, by angling the position of the heater 14 with respect to the preform 10, the material viscosity in the preform 10 varies across the width of the furnace 12. Accordingly, as the preform 10 is drawn through the furnace 12, the resulting filter film or sheet will have varying optical properties across the width of the furnace 12 due to varying layer thicknesses.

In FIG. 3A, where only one of the two heaters 14 is positioned to enclose an acute angle α with the surface 18 of the preform 10, mostly those material layers will vary in thickness that are located near the one surface 18 of the preform 10 that faces the angled heater 14. In FIG. 3B, the heat gradient is applied from both surfaces 18 and 20 by positioning each of the two heaters 14 to enclose an angle α and β, respectively, with the surfaces 18 and 20 of the preform 10. The angles α and β may be chosen independently from each other or may be identical and mirror each other as shown in FIG. 3B. In FIG. 3C the film layers near one surface 20 will have reduced thickness from the left to the right, while the film layers near the opposite surface 18 with have an increased thickness from the left to the right because one of the heaters 14 increases its distance from the preform from the left to the right at angle β, while the other heater 14 decreases its distance from the preform from the left to the right at angle α. The angles α and β between the heaters 14 and the preform are specific to individual furnaces 12 and can be empirically determined by calibration. For example, the angles α and β depend on the amount of heat dissipation from the heaters, which is influenced by the geometry and material of the furnace 12 and affects the effective temperature applied to the preform 10.

Another example of varying the effective temperature or heat power density across the furnace 12 includes non-uniform insulating or heat conductor materials placed in front of uniform heating elements 16 to control the profile of the heat radiation transferred from the heater 14 to the preform. This non-uniformity can be created by varying one of more properties of the material placed between the heater 14 and the preform, such as thickness, porosity, or face dimensions.

Figure 4A:
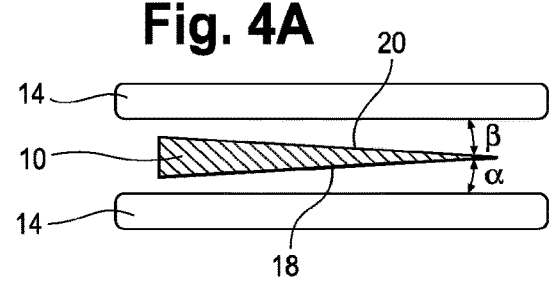
FIGS. 4A, 4B, and 4C show alternative examples for providing preforms of varying thickness over the width of the furnace.

Instead of introducing changes to the furnace 12, changes to the preform 10 can be made to create variable filters. One possible configuration is shown in FIGS. 4A-4D and another one in FIGS. 5A and 5B. When drawing a preform 10 with an asymmetric starting geometry, while keeping the speed at which the preform 10 is drawn through the furnace 12 and the tension across the preform unchanged, the resulting filter film will then in return be of different thickness and therefore of varying spectral shape. Examples of preforms with a wedge geometry can be seen in FIGS. 4A, 4B, and 4C. A wedge geometry of the preform 10 will then generate a film that is thicker on one lateral side with a gradually changing thickness toward being thinner on the other lateral side as there is more material in the original preform 10 on the thicker side of the wedge. The gradual change in thickness will then translate into varying spectral properties across the filter. The wedge form may be placed in the furnace to form two acute angles α and β of its surfaces 18 and 20 with the respective adjacent heaters 14 as shown in FIG. 4A, or to be parallel to one of the heaters and to form only one acute angle α between one surface 18 and the adjacent heater 14. Furthermore, as FIG. 4C shows, the cross-section of the wedged preform 10 may be trapezoidal, where the apex of the wedge is cut off.

Figure 4B:
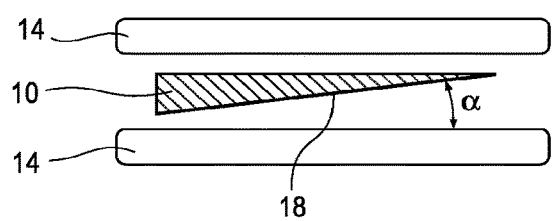
Figure 4C:
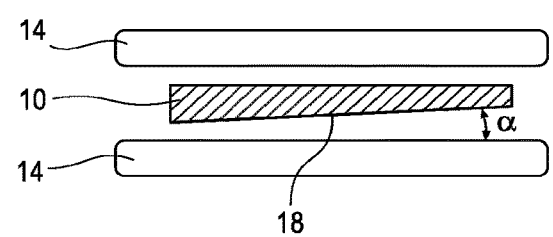

Notably, the wedged preforms of FIG. 4A, 4B, or 4C may be combined with heaters 14 that are angled relative to each other as shown in FIG. 3A or 3B, for example such that the heaters 14 may both be parallel to the respective surface s 18 and 20, or that the heaters are spaced farther apart from each other on the thinner side of the preform than on the thicker side of the preform because the thinner side may require a lesser heating power density.

Figure 5A:
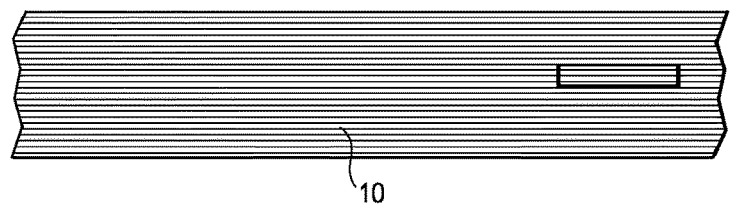
FIG. 5A shows a schematic cross-section through a multilayer thin-film filter.
Figure 5B:
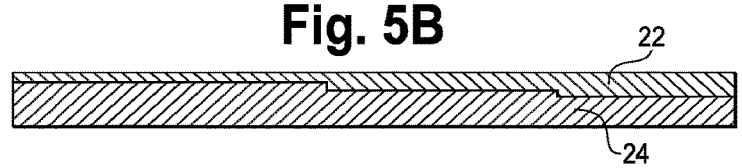
FIGS. 5B, 5C, and 5D show three different examples of partial enlarged cross-sectional views through a multilayer thin-film filter.
Figure 5C:
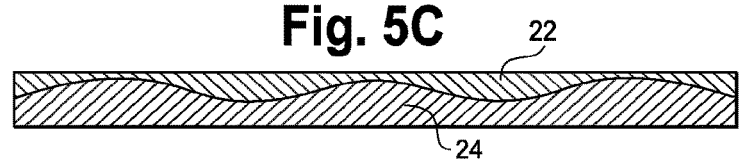
Figure 5D:
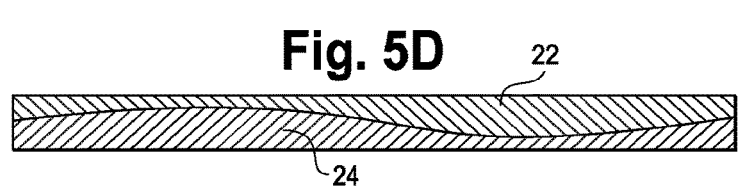

Another modification to the geometry can be applied to the layers found within the preform. FIG. 5A shows a cross-section of a multilayer preform 10, and FIGS. 5B, 5C, and 5D show three examples of non-uniform layer configurations in enlarged views representing the rectangular detail marked in FIG. 5A, where the two different hatchings represent layers 22 and 24 of two different alternating materials that make up two layers of the multilayer structure of the resulting thin film filters. The remainder of the multilayer structure may be formed of stacked layers of the same alternating materials or of different materials. Applying uniform heat to a preform 10 containing layers 22 and 24 that contact each other at curved interface surfaces will result in a filter film with layers whose thicknesses are have the same proportions to each other as the thicker layers 22 and 24 of the preform 10. The layer thicknesses, however, are greatly reduces relative to the layer thicknesses of the preform 10.

Figure 6A:
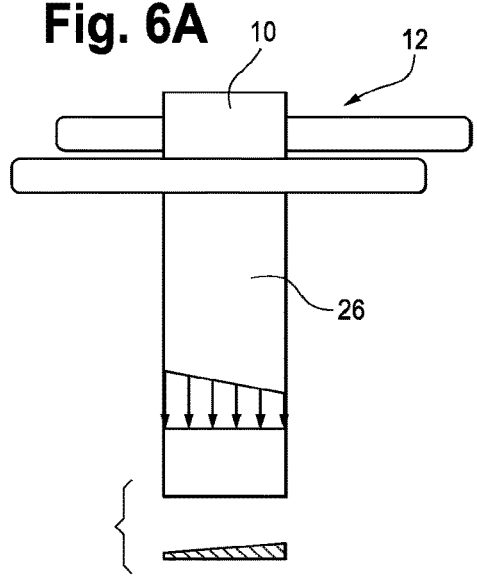
FIGS. 6A and 6B show in schematic illustrations two examples of an arrangement for varying the thickness of a thin-film filter.
Figure 6B:
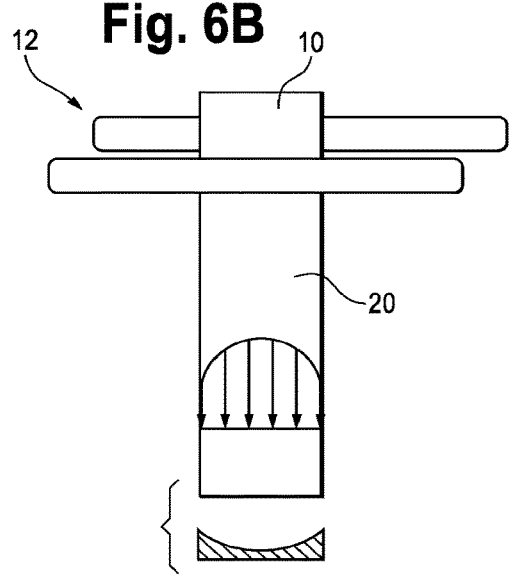

Another draw parameter that can be modified to have an effect on the thickness on the film across the film for generating variable filters is the tension and/or draw speed of the draw across the furnace. FIGS. 6A and 6B show two possible tension profiles across the furnace 12, where a greater drawing speed causes a greater tension in the heated, softened preform 10 and thus creates a thinner film 26 and vice versa. FIG. 6A shows a linear profile which can be accomplished by pulling faster one side of the film compared to the other side resulting in a gradual increase in thickness from left to right and therefor a varying spectral shape across the film. In a similar fashion, FIG. 6B shows a tension profile where the film is pulled faster from the middle section and slower at the edges resulting in a thinner film in the middle and gradually growing in thickness as it approaches the edges.

A laterally varying drawing speed can be achieved by applying uneven pressure across the width of the preform between opposing rollers that pull the film 26. The uneven pressure may be a higher pressure on one lateral side than on the opposite lateral side by pressing the rollers together at a higher force on one side than on the other side. For attaining a different drawing speed in the center than on the lateral sides of the preform 10, specialty rollers that are not completely straight. Either the core of the roller can be slightly bent or the rubber on the roller can be shaved to create any arbitrary thickness profile that results in a matching pressure (and speed) profile across the width. For achieving a different and changeable distribution of drawing speeds, a different pressure distribution across the width of the rollers and across the furnace may be achieved by forming the rollers of a plurality of roller segments across the width with individually adjustable pressure and/or drawing speed. Generally, rollers or individual roller segments may be made of elastically compressible material for an enhance pressure distribution. The rollers or roller segments may have varying or differing roller diameters so that in locations of greater diameters a greater pressure is exerted to the preform and, due to the greater roller circumference, additionally a locally greater drawing speed is achieved.

Figure 7A:
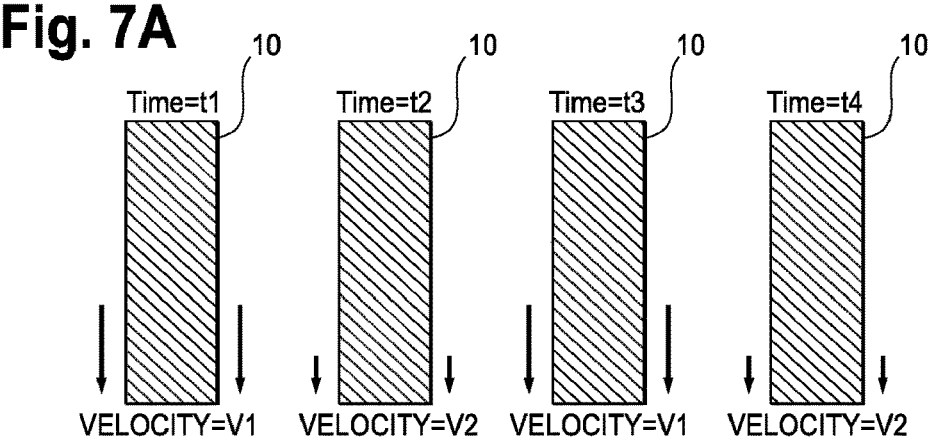
FIGS. 7A and 7B show an example of varying at least the thickness or width of a filter film by changing the velocity of the filter film moved through the furnace.
Figure 7B:
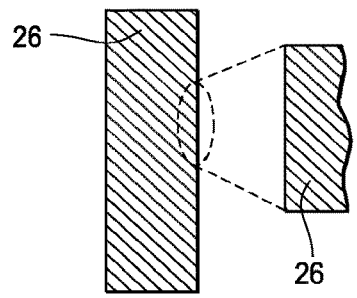

In another example, increasing and decreasing the drawing speed and tension over time can be used to induce shifts in the spectrum along the drawn filter film 26 or sheet. FIG. 7A illustrates a drawing process, in which the drawing speed is varied over time between a first velocity V1 and a second velocity V2. FIG. 7B demonstrates the effects that this oscillating draw speed would have in the film. In contrast to varying the tension across the furnace, changing the drawing speed over time will have an effect in the thickness of the film 26 in the longitudinal direction instead of the lateral direction.

FIG. 7B shows a cross-sectional view to illustrate the thickness of the resulting filter film 26. Gradually increasing the speed of the draw and then gradually decreasing the speed, while applying the same tension across the horizontal direction at each time interval will then result in the increase and decrease of thickness in the longitudinal direction of the film 26. As the change in film thickness with proportionally affect the thicknesses of layers that make up the film, the change in film thickness also changes the spectral properties of the film.

This variation in film thickness provides a further alternative of additional option for creating variable filters. The transition areas between various drawing speeds will form varying filters along the vertical direction. The gradient or step size of changing the drawing speed relative to a feed speed or roller resistance applied to the preform dictate the length along the resulting film 26, over which the spectral shift takes place. Slow speed changes result in slowly varying filters, and vice versa. While the width of the resulting filter film 26 may also vary with varying drawing speed, this effect is of a much smaller proportion than the change in thickness.

Post-Processing Methods of Producing Variable Filters

Figure 8A:
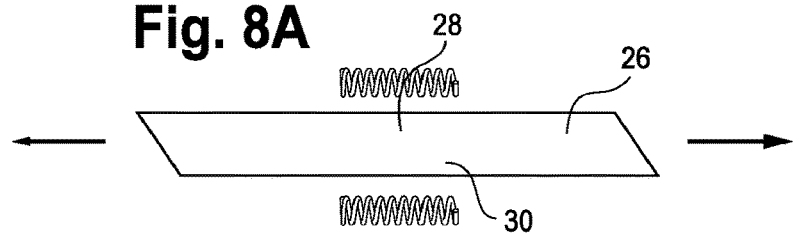
FIGS. 8A, 8B, and 8C show a schematic illustration of an arrangement to change at least the thickness or the width of a thin-film filter by applying heat and a tension force.
Figure 8B:
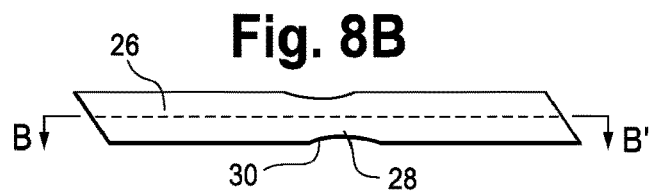
Figure 8C:
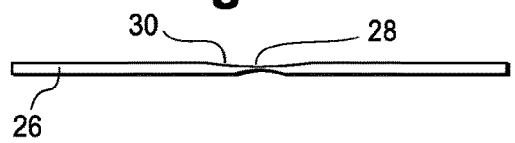

Creating a filter with varying properties can also be accomplished as part of a post-processing treatment of a uniform filter film 26 or sheet. One example of such a post-processing treatment is illustrated in FIGS. 8A, 8B, and 8C. After the preform 10 has been drawn into an intermediate filter film 26 or sheet (which itself may already form a planar optical filter), a zone 28 of the film 26 or sheet can then be heated to a temperature close to the glass transition temperature of the material to soften the film 26 sufficiently to cause a permanent deformation. While the film material is still hot, a pulling force F can be introduced to opposite lateral or longitudinal ends of the film 26, resulting in a stretch in the film as seen in FIG. 8A. Stretching the film one direction results in reduced dimensions in the other two dimensions perpendicular to the stretching direction of the pulling force F as indicated in FIGS. 8B and 8C. The border regions 30 of the heated area 28, where a transition takes place between stretched and unstretched portions of the film 26, form regions with changing layer thicknesses and thus varied optical properties of the filter film 26. The geometry of the heating zone 28, the temperature of the heating zone 28, and the distance of a heat generator from the filter film determine the rate of filter spectral shift per unit length. For example, a greater distance of the heat generator from the surface of the filter film causes a more gradual change in the filter properties and accordingly wider border regions 30 than a smaller distance applying a very localized heat.

In another example, a section of a filter film, which may be uniform or manufactured to have a non-uniform thickness, can be placed in a customized mold or press which slightly heats the filter film. This mold or press can apply varying pressure to various parts of the filter film resulting in a slight change in the filter film thickness and its spectral characteristics. This method can be used with molds with two dimensional variations to create two dimensionally varying filters. For example, a mold press that replicates the curvature of a lens can be used to serve two purposes: (1) slightly bend and stretch the filter film for conforming the filter to the lens surface without inducing stress in the film, and (2) slightly shifting the spectral properties of the filter in a radial pattern to compensate effects of the angle of incidence on filter's spectral shape for light impinging on various parts of the lens at various angles.

In another example, the uniform filter film or sheet can be placed on a surface that may be slightly heated. This surface can have wedged shaped slopes (or uneven surface with various depth profiles) on which the filter film can be placed with the surrounding sections being flat and parallel. A cold or heated roller can then roll over the filter film or sheet to gradually compress the filter film or sheet to various degrees as the rollers goes along the length of the sloped area. This uneven pressure on the filter while it is close to its materials' softening point can induce changes in the filter layer thicknesses and therefore spectral shift following the same depth profile as the uneven (sloped) section of the substrate surface.

Methods of Temporally Varying Filters

All methods and examples disclosed above are related to creating spatially varying filters with varying spectral characteristics across the physical dimensions of the filter, longitudinal or lateral, or both.

Another method of varying a filter's characteristics is through heating. All materials have finite coefficients of thermal expansion (CTE). This causes a change in the thickness of thin film layers, resulting in a shift in the transmission spectrum curve (thermal spectrum drift). In hard-coated traditional filters, this effect has a minimal influence on the spectral characteristics due to the low CTE of hard oxide and other materials used in hard-coated thin-film filters. However, most thermoplastic polymers used for thermally drawing optical filter films and sheets have relatively higher CTE, resulting in a more pronounced spectral drift due to temperature fluctuations. This effect can be brought under control to be used as a method of temporarily varying filter properties and shifting its spectrum. The filter properties change depending on the local temperature so that the optical properties are transient and changeable during use of the filter film.

This can be achieved in a variety of manners. In one configuration, the filter film or sheets can be mounted in a small temperature-controlled holder that can controllably change the temperature in the filter's surrounding. In another configuration, the filter film or sheet can be placed against (or laminated on) a glass substrate that is temperature controlled. This temperature controlling can be achieved by attaching heating and cooling plates (such as thermoelectric generators or modules) to the glass peripheries outside of the filter's clear aperture. It can also be achieved by laminating the filter on a glass substrate that has a transparent conductor coating (such as Indium Tin Oxide, ITO) with high resistance that can cause heating through surface current generation. Examples of ways to mount the filter film in a holder or frame, or on a substrate, are described in WO 2017/180828, which is incorporated herein by reference in its entirety.

These temporary thermally induced filter modifications may be applied to both uniform and variable filters. A filter with temporarily changing optical properties is especially useful in applications where a rapid change of optical properties is not required. For faster changes, a filter having spatially varied properties may be movably installed so that the optical properties are changed by moving the filter perpendicular to a viewing direction.

In summary, various options of manufacturing multilayer filter films with varying optical properties have been presented. Further, methods of modifying optical filters after the drawing process have been described. Two or more of these options and methods may be combined to provide more complex modifications if desired. It is, for example, to be understood that post-processing procedures can be applied to films, whose properties have been modified during the drawing stages of the films. Also, a permanent deformation by heat application may be followed by temporary modifications. Accordingly, all of the provided processes are not mutually exclusive, but complement each other.

While the above description constitutes the preferred embodiments of the present invention, it will be appreciated that the invention is susceptible to modification, variation and change without departing from the proper scope and fair meaning of the accompanying claims.

What is claimed:

1. An optical filter film produced by the step of drawing a multilayer polymeric preform into an optical filter while varying at least one environmental condition being a member of the group consisting of heat, pressure, tension, and a drawing speed, the at least one environment condition being varied over time or over a distance, or both, and causing a variation in layer thickness within the optical filter.

2. The optical filter film of claim 1, wherein the optical filter film is produced by the further steps of:
   positioning heaters on opposite sides of the preform, wherein the opposite sides of the preform extend along a drawing direction of the preform, the width of the furnace extending across the drawing direction, and
   drawing the preform through the furnace in the drawing direction.

3. The optical filter film of claim 1, wherein the at least one environmental condition is heat and tension, wherein the preform is drawn through a furnace subjecting the preform to a heating power to form an intermediate filter film.

4. The optical filter film of claim 3, wherein the optical film is produced by the further steps of:
   exposing the intermediate filter film to heat in a specified location and to a tension force in at least a longitudinal or lateral direction of the intermediate filter film, and stretching the intermediate filter film until the layer thickness is permanently reduced in the specified location to form the optical filter having a locally reduced layer thickness.

5. The optical film of claim 1, wherein the multilayer polymeric preform includes preform layers of uneven thickness.

6. The optical filter film of claim 1, wherein the multilayer polymeric preform has a wedge shaped or trapezoidal cross-section.

* * * * *